United States Patent Office 3,287,314
Patented Nov. 22, 1966

3,287,314
FERROCENE AND ITS DERIVATIVES AS PHOTO-
STABILIZERS FOR SYNTHETIC RESIN
Robert M. Van Vliet, 6922 Rushton Drive, Dayton, Ohio
No Drawing. Filed Apr. 17, 1962, Ser. No. 188,283
6 Claims. (Cl. 260—45.75)

The invention described herein may be manufactured and used by and for the United States Government for governmental purposes without the payment to me of any royalty thereon.

The present invention relates to photostable compositions of matter and to the processes by which they are made. The invention relates particularly to coating materials composed primarily of resinous or polymeric substances which are resistant to deterioration under the influence of or are capable of absorbing large quantities of ultraviolet radiation and the like, as a protection for the coated material.

While attention has for sometime been given to the problems of photostable materials to be used as coatings for terrestrial applications, such as for the temperature control of aircraft and the like, the advent of the nuclear age and, still more recently, ventures into inter-planetary space have magnified many times the radiation absorption problems and have made their solutions most critical to progress, particularly as it concerns man's travels through space. Whereas the prior equipment has been confronted only with the relatively longer wavelength radiation that is capable of penetrating the atmosphere in relatively small quantities, the space environment does not enjoy the filtration benefits of an atmosphere and is therefore characterized by intense radiation over a very broad spectrum, particularly in the wavelength region of from 2,000 to 3,000 angstroms which are normally not encountered on the earth or in the earth's atmosphere. Increased radiation in the range of from 3,000 to 4,000 angstroms is also encountered above the earth's atmosphere.

Further complications from the standpoint of photostability resulting from radiant flux concentration in the 2,000 to 4,000 angstrom region, include the fact that this same wavelength spectrum is the primary absorption region for common electron-rich bonds such as are found in the polymeric materials normally used or considered useful as coatings. Moreover, the energy per photon in this region exceeds the energy of typical chemical bonds, thus making polymer breakdown probable. Photochemically induced changes or degradation of materials result in the shifting of absorption bands toward or further into the visible region of the spectrum. This condition leads to a shifted temperature equilibrium of the substrate due to its higher energy absorption and introduces destructive and erratic variations in the heat balance of a space-traveling vehicle.

A few film-forming materials which do not inherently absorb ultraviolet light, and therefore should not degrade, are observed to decompose nevertheless due to the photosensitizing or catalytic action of impurities which are apparently universally present. A few basic polymers (such as pure melamine formaldehyde) do exhibit a degree of photochemical stability, but this material is inherently a poor substrate. In view of the foregoing problems and experience, the future of the use of polymer films as substrates for temperature control systems in inter-planetary space, though they are otherwise desirable, was considerably clouded.

It is accordingly an object of the present invention to provide a photostable composition of matter which is resistant to deterioration under exposure to ultraviolet radiation, particularly in the wavelength band of from 2,000 to 4,0000 angstroms and in the environment of outer space.

It is another object of the present invention to stabilize organic compounds, resins or polymers against the degrading effects of ultraviolet radiation by use of additives that are admixed with or will react with and become a part of the polymeric compound so that evaporation, diffusion or extraction of the stabilizer will not occur.

Still another object of the present invention is to provide coatings or substrates, even of materials such as have been used in the past for geo-atmospheric applications, which will be capable of performing functions of heat control, retention of mechanical strength and the like in outer space, throughout prolonged exposure to the environment thereof. The materials are assembled under laboratory conditions of temperature and pressure at about 22° C. and about one atmosphere of or 760 millimeters of mercury pressure.

To achieve these and other objects and advantages which will appear from a reading of the following disclosure, the present invention provides for the use with conventional coating materials, including organic, resinous, or polymeric compounds, of additives based on, or derivatives of iron dicyclopentadiene, commonly referred to as ferrocene, and its aliphatic and/or aromatic derivatives.

In the ferrocene, sometimes designated Fc or $(C_5H_5)_2$ Fe or as $C_{10}H_{10}Fe$, one or both of the cyclopentadiene rings may be substituted with an aliphatic or an aromatic group and where one substituent is on each cyclopentadienyl ring, the compound is designated 1,1'. For example, $1,1'\text{-Fc(COOH)}_2$ is ferrocene dicarboxylic acid with one carboxylic acid group on each ring. The function of the substituent is to lower the evaporation rate through increased molecular weight, to provide sites for reaction with the polymeric material, and to increase the solubility or surface activity of the compound or to broaden its absorption spectrum. The substituents appear to have no effect on the photostability of the ferrocene to ultraviolet radiation but it has been found that they do affect its solubility and to a lesser extent, the breadth of its absorption spectra for the ultraviolet radiation.

The ferrocene derivatives are incorporated with or into the coating materials by ordinary compounding and mixing practices, either at the synthesis of the material, during the batch preparation or at some stage during fabrication or application of the coating. The derivatives so incorporated have been found to stabilize the material as a result of what is now believed to be an absorption by the derivative of the ultraviolet radiation more rapidly than such radiation tends to be absorbed by the polymer and of a screening or filtering phenomenon wherein the ferrocene derivatives seem to concentrate near the surface of the coating thereby to prevent intense exposure of the rest of the substrate to the radiation. In many instances, coatings of such conventional materials as addition product polymers; e.g. the polyvinyls, or condensation product polymers, co-polymers or resins such as the epoxys, the polyesters, silicones and the like, incorporating the teachings of this invention have been found extremely effective in decreasing the rate of polymer yellowing by many factors of ten.

In addition to being employed by themselves with conventional coating materials to improve photostability, the ferrocene derivatives have been found to produce synergistic effects when they are combined with the polymer along with some of the prior art photostabilizers such as those of the hydroxybenzophenone type. Examination of the absorption spectra of such trinary mixtures indicates that the ferrocene derivatives more effectively absorb the shorter wavelength ultraviolet light thereby protecting the hydroxybenzophenone which, on the other hand, absorbs the longer wavelengths more strongly than most ferrocene derivatives. While it has been found that the effectiveness of the ferrocene derivatives from the standpoint of stability and resistance to deterioration under exposure to ultraviolet radiation increases with increased concentration of the stabilizer, in concentrations wherein the ferrocene derivative is present in a greater proportion than five percent by weight, the initial red or yellow color of the ferrocene compound is generally objectionable and competes with the color change that might normally be encountered upon deterioration of the polymer. Nonetheless, true photostability has been found to increase to a maximum at 100% of the ferrocene material.

The photostability and the photostabilizing effects of ferrocene and its derivatives are unobvious and were hitherto unexpected attributes of this material which itself was not discovered until 1951 and has been reasonably well known to the art only for the past six or seven years. Prior to the discoveries underlying the present invention, one of the primary forms in which the ferrocenes were employed was in solution with carbon tetrachloride; and a peculiarity of this particular common state was that the solution was characterized by very poor photostability. The prior art mistakenly but understandably attributed this lack of photostability to the general nature of the ferrocenes, and they were not therefore considered to have any potential as photostabilizers.

The identification of the reactants and the reagents of interest in the five cited examples herein by their compositions or their structural formula are:

(1) Dibenzoyl ferrocene

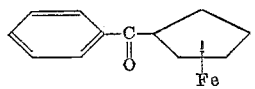

$(C_6H_5CO)_2Fc$

Methyl "Cellosolve" or 2-methoxy ethanol

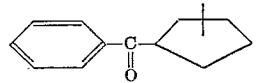

$CH_3OCH_2CH_2OH$

Hydroxybenzophenone

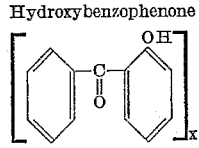

$C_6H_5COC_6H_3OHX$ where $x$ represents —$OCH_3$, —OH or other groups which influence the solubility of the molecule.

Dimethylol melamine resin or dimethylol 2,4,6-triamino-S-triazine

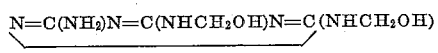

(2) 2-hydroxybenzoyl ferrocene

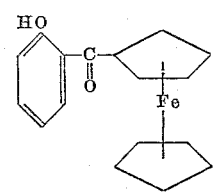

Methyl phenyl silicone

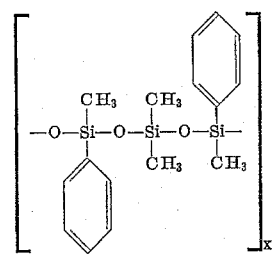

as a typical or representative formula since the value of $x$ varies.

Alkyd resin

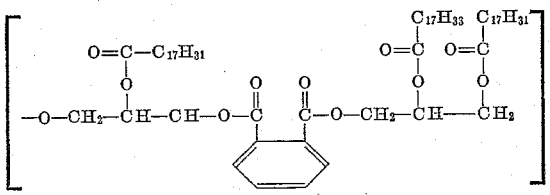

as a representative or typical formula since the value of $x$ may vary.

(3) 1,1'-ferrocene dicarboxylic acid

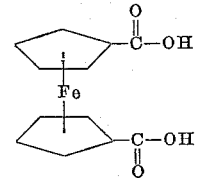

Methyl ethyl ketone

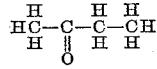

(4) 1,1'-diethyl ferrocenate

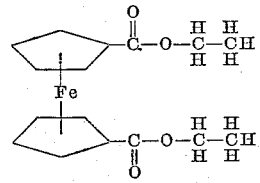

Polyvinyl butyral

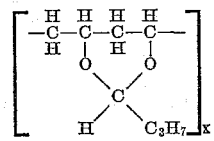

where $x$ is an integer for pure polyvinyl butyral. The commercial product usually contains an alcohol.

(5) 2,2'-4,4'-tetrahydroxybenzophenone

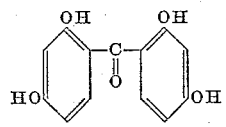

The wide variety of solubility properties and improvements in photostability which are available upon the use of the various ferrocene derivatives with various polymers is demonstrated by the following examples:

*Example I.*—0.01 to 5 grams of 1,1'-dibenzoylferrocene was dissolved by stirring it into 400 grams of a 25% by weight solution of a dimethylol melamine resin in methyl Cellosolve or 2-methoxy ethanol positioned within a container. A film was then cast from this solution by pouring the solution on a suitably prepared surface to obtain a clear resinous coating which after drying was very resistant to ultraviolet degradation. The viscosity of the poured solution determines the thickness of the film and is controlled by mixing into the solution more or less of the solvent methyl Cellosolve. The higher the initial concentration of the stabilizer 1,1'-dibenzoylferrocene, the more intense is the initial color but the higher the stability of the product toward radiation.

*Example II.*—0.01 to 5 grams of 2-hydroxybenzoyl ferrocene was stirred into a toluene solution of 50 grams of methyl-phenyl silicone such as that manufactured and distributed commercially by Dow Corning Corporation of Midland, Michigan and known by its trademark No. 840 and with 50 grams of alkyd resin such as that commercially sold by American Cynamid at New York, N.Y. under its trademark "Cyzac 1006." The resulting solution was adjusted to a free flowing condition such as a 40% non-volatile content by the addition of toluene and cast as a film on a suitably prepared surface of a substrate and baked at 300° F. for 15 minutes to cure the resin. The methyl-phenyl silicone and alkyd resin are purchased in toluene solutions. A tough, durable film resulted with virtually no degradation to ultraviolet light until after extended exposure with low stabilizer concentrations.

*Example III.*—5 grams of 1,1'-ferrocene dicarboxylic acid was dispersed and partially dissolved in 100 grams of dimethylol melamine in methyl ethyl ketone. The resulting solution was cast onto a suitably prepared substrate; and, after the solvent evaporated, the film was baked at 300° F. to react the melamine and the 1,1'-ferrocene dicarboxylic acid, thereby cross-linking the melamine to provide a stable hard film on the substrate.

*Example IV.*—0.1 to 5 grams of 1,1'-diethylferrocenate was dissolved in 200 grams of methyl ethyl ketone after which 200 grams of ethyl alcohol and 100 grams of polyvinylbutyral were added. This mixture was stirred until the polymer thoroughly dissolved and was then cast as a film. It was found that the larger the concentration of the 1,1'-diethylferrocenate stabilizer, the darker the initial film but the greater the stability thereof to extended exposure to ultraviolet radiation.

*Example V.*—To 400 grams of a 25% by weight solution of dimethylol melamine in methyl Cellosolve or 2-methoxy ethanol in a container were added 2.5 grams of 2,2'-4,4'-tetrahydroxybenzophenone and 2.5 grams of 1,1'-ferrocene dicarboxylic acid. This mixture was stirred until thoroughly dispersed and cast on a suitably prepared surface to form a film which was found to have about four times the ultraviolet resistance of a similar formulation using 5% of the 2,2'-4,4'-tetrahydroxybenzophenone type stabilizer without the addition of the 1,1'-ferrocene dicarboxylic acid or ferrocene derivative.

Examples I and II above are demonstrative of the influence of mono-substituted and di-substituted aromatic ferrocene derivatives; and substantial experimentation with a wide variety of such derivatives has shown that they generally impart the highest degree of radiation absorption to the coating materials in which they are incorporated. While the stabilizing effects of small quantities of these various aromatic derivatives vary as a matter of some small degree among themselves, in none of the experiments involving their use was there any deterioration or decomposition observed upon exposure to ultraviolet radiation. At the same time, there appeared to be no substantial difference between the mono-substituted and the di-substituted derivatives. Further with regard to the use of the aromatic ferrocene derivatives, it has been discovered that higher solubility and improved compatibilty of the stabilizer with the polymer may be obtained through a modification of the aromatic derivative by the addition of aliphatic groups to the aromatic nucleus, such for example as by the addition of a para-methoxy-substituent to benzoyl ferrocene.

Examples III and IV above constitute typical uses of aliphatic ferrocene derivatives as stabilizers; and these are found to be more compatible with certain polymers, particularly those which, such as polyvinyl butyral, show little tolerance to aromatic solvents. While compositions containing the aliphatic derivatives may not be quite as stable as those containing aromatic derivatives, they nonetheless represent a substantial improvement over the prior art photostabilizers. In the case of the aliphatic derivatives also, little difference has been noted between the effects of mono-substitution and di-substitution. As shown by Example III, the mono-substituted or di-substituted acid can be selected to control the cross-linking of the particular polymer if such cross-linking is desired.

Example V demonstrates the effectiveness of a trinary combination of stabilizers and polymer wherein a ferrocene stabilizer of the type considered by the present invention and a second stabilizer in the form of the prior art benzophenones are employed together in the coating material. As indicated by the results set forth in the example, a formulation employing the two stabilizers in a combined weight ratio of 5% based upon the polymer results in a synergistic improvement of the photostability of the coating which has been found to be considerably greater than the photostability that would be obtained if the entire 5% consisted solely of either the benzophenone or the ferrocene derivative. While not all such trinary mixtures may provide such improvement, the use of the benzophenone stabilizer has been found to have the further advantage of allowing the addition of larger amounts of the stabilizer without deleteriously affecting the initial color of the coating.

While the present invention has been herein described in connection with certain specific embodiments thereof, it is to be understood that the foregoing particularization and detail have been for the purposes of illustration only and do not limit the scope of the invention as it is defined in the subjoined claims.

I claim:
1. A photostable composition comprising
  (1) a resin selected from the group consisting of poly vinyl butyral and melamine resins, and
  (2) .01% to 5% by weight, based upon the weight of the resin, of a ferrocene derivative selected from the group consisting of 1,1'-dibenzoyl ferrocene, 1,1'-ferrocene dicarboxylic acid and 1,1'-diethylferrocenate as a stabilizer for the resin.
2. The composition of claim 1 wherein the ferrocene derivative is 1,1'-dibenzoyl ferrocene.
3. The composition of claim 1 wherein the ferrocene derivative is 1,1'-ferrocene dicarboxylic acid.
4. The composition of claim 1 wherein the ferrocene derivative is 1,1'-diethylferrocenate.
5. A photostable composition comprising
  (1) a resin selected from the group consisting of polyvinyl butyral and melamine resins, and
  (2) about 5% by weight, based upon the weight of the resin, of a stabilizer consisting of (a) a ferrocene of the structure,

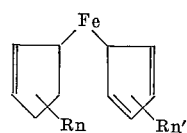

where R is a member selected from the group

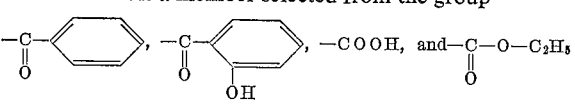

and the sum of $n$ and $n'$ is an integer from 1 to 2, and (b) a hydroxybenzophenone.
6. A photostable composition comprising
  (1) a resin selected from the group consisting of polyvinyl butyral and melamine resins, and
  (2) .01% to 5% by weight, based upon the weight of the resin, of a ferrocene derivative as a stabilizer for the resin selected from the group consisting of 1,1'-dibenzoyl ferrocene, 1,1'-ferrocene dicarboxylic acid, and 1,1'-diethylferrocenate.

References Cited by the Examiner

UNITED STATES PATENTS

| | | | |
|---|---|---|---|
| 2,680,756 | 6/1954 | Pauson | 260—45.75 |
| 2,979,482 | 4/1961 | Piccoli | 260—45.75 |
| 3,006,887 | 10/1961 | Schoepfle | 260—45.95 |
| 3,008,995 | 11/1961 | Hoeschele et al. | 260—45.95 |
| 3,105,094 | 9/1963 | Hoeschele | 260—45.95 |

OTHER REFERENCES

Anon., Chem. & Eng. News, vol. 39 (38), 1961, page 51 relied upon.

R. E. Benson and R. V. Lindsey, Jr.; J.A.C.S., vol 79 (1957), pp. 5471–73.

MORRIS LIEBMAN, *Primary Examiner.*

ALEXANDER H. BRODMERKEL, *Examiner.*

J. W. BEHRINGER, J. E. CALLAGHAN,
*Assistant Examiners.*